Jan. 12, 1965 A. J. OUELLETTE Re. 25,710

BABY CARRIER

Original Filed Jan. 30, 1959 3 Sheets-Sheet 1

Alfred J. Ouellette
INVENTOR.

BY Murray Robinson
ATTORNEY

BABY CARRIER

Original Filed Jan. 30, 1959 3 Sheets-Sheet 2

Alfred J. Ouellette
INVENTOR.

BY Murray Robinson
ATTORNEY

Jan. 12, 1965 A. J. OUELLETTE Re. 25,710

BABY CARRIER

Original Filed Jan. 30, 1959 3 Sheets-Sheet 3

Alfred J. Ouellette
INVENTOR.

BY Murray Robinson
ATTORNEY

United States Patent Office

Re. 25,710
Reissued Jan. 12, 1965

25,710
BABY CARRIER

Alfred J. Ouellette, St. Paul, Minn., assignor, by mesne assignments, to Infanseat Company, Eldora, Iowa, a corporation of Iowa Original No. 3,006,688, dated Oct. 31, 1961, Ser. No. 790,184, Jan. 30, 1959. Application for reissue Dec. 14, 1962, Ser. No. 245,369
22 Claims. (Cl. 297—457)

Matter enclosed in heavy brackets [ ] appears in the original patent but forms no part of this reissue specification; matter printed in italics indicates the additions made by reissue.

*The subject matter of this invention is a device serving as a baby support. The support serves as a packboard when it is desired to carry the baby in the arms of an adult, and for this reason is called a baby carrier. When the support is put down, it serves to hold the baby in various positions according to the angle at which it is propped, e.g. with the baby's back vertical, near vertical, near horizontal, horizontal, or in varous lounging positions therebetween. The device has thus been called a baby seat or baby lounger.*

*In the past, supports of the foregoing character have been known in which the support included a solid shell or body within which was placed a pad or mattress. The pad provided a cushion between the bady and the solid shell.*

*An object of the invention is to provide a baby carrier shell which has a resilient cushion area over the major portion of its back.*

*According to the invention the shell may be made entirely of a sheet of flexible resilient material. Polyethylene is a suitable material, being a durable substance as well as one which is easily colored. Suitable apertures and slots may be provided in the shell for securing the shell to a chair or automobile seat and for strapping the baby in the shell. The shell is perforated at its back and sides to provide ventilation, reduce weight, and conserve material. The perforations in the back add to the cushioning action thereof. By forwardly offsetting the major portion of the back between the side edges thereof, there is provided a cushion area; since this area is perforated it acts like a web spring. To provide a rigid framework for maintaining the shape of the flexible shell, a reinforcing and stiffening flange is disposed at forward edges of the sides and bottom of the shell. This flange together with the adjacent body of the shell forms a channel of* U*-shaped cross-section which has the added advantage of providing a convenient hand grip. The back of the shell is curved in section taken parallel to the bottom, i.e., curved in plan considering the shell in a position with the baby's back erect, and this not only supports the baby better but stiffens the shell against flexure perpendicular to the bottom thereof. The perforations in the shell are preferably in the form of slots, those in the back extending lengthwise of the back and those in the sides extending transversely to the back.*

*For a more detailed description of a preferred embodiment of the invention reference will now be made to the accompanying drawings wherein FIGURE 1 is a perspective, FIGURE 2 is a section taken at 2—2 of FIGURE 1, FIGURE 3 is a fragmentary view of the upper left side and integral marginal flange, and FIGURE 4 is a section taken at 4—4 of FIGURE 1.*

*Referring now especially to FIGURE 1, there is shown a shell 10 formed of a sheet of flexible resilient material as an integral one piece unit to which the aforementioned detachable cords and straps (not shown) may be attached. The shell includes a bottom 12, back 14, and side panels 16 and 18 connected to the shell bottom 12 along opposite edges 20 and 22 and to the shell back along opposite edges*

*24 and 26. The sides 16 and 18 may be slightly tapered at their upper edges 28 to form a continuous line with the upper edge 30 of the back 14 of the shell. Viewing the baby carrier by analogy to a chair, one would say that there is provided a seat body 10 including a seat bottom or seat portion 12 and a seat back or back portion 14.*

*The central portion 32 of the back of the shell is forwardly offset. This offset extends from shoulder 34 near the upper edge of the back downwardly between vertical edges 24, 26, whereat are thus formed gutters, until it gradually merges with the bottom portion 36 of the back. The central portion 32 is perforated, forming a series of spaced slots or apertures 38 extending lengthwise of the back leaving a pattern of longitudinal and transverse webs therebetween. The side portions of the shell are perforated near the deeper bottom portions thereof providing apertures or slots 40 extending transverse to the plane of the back of the shell and leaving transverse or horizontal webs therebetween.*

*A pair of apertures 42 is provided on each side of the upper part of the back of the shell adjacent the edges 24 and 26. Through these apertures cords (not shown) may be attached for securing the shell of the baby carrier to an auto seat or a chair. The back of the shell is also provided at each side near the transverse center line of the back with a pair of slots 44 through which belt straps (not shown) may be run for holding a baby in the carrier. There may also be provided a restraining strap (not shown) connected with the belt straps and extending between the legs of the baby to a slot 52 at the front of the bottom of the shell. The slot 52 may also be used for straps anchoring the baby carrier in position.*

*Referring especially to FIGURE 4, the offset portion 32 of the back is curved in plan, being concave viewed from the front of the carrier as indicated at 54. This curve in the back, extending between edges or gutters 24 and 26, accommodates the contours of the baby's body, thereby increasing its comfort.*

*A marginal flange 46 extends at substanially a right angle from the sides 16 and 18 of the baby carrier shell and from its bottom 22. Another flange 48 connected to flange 46 extends rearwardly at substantially a right angle. The flanges both extend upwardly at the sides of the shell to terminate near the upper edge of the back at point 50. Together, the flanges 46 and 48 form with the adjacent portions of the sides 16 and 18 and bottom 12 a channel shaped marginal stiffening and reinforcing means. This rearwardly opening channel also forms a convenient handgrip, especially suited for lifting the baby carrier when disposed with its back near horizontal.*

*While a preferred embodiment of the invention has been shown and described, many modifications thereof can be made by one skilled in the art without departing from the spirit of the invention, and it is intended to cover by Letters Patent all forms of the invention falling within the scope of the following claims.*

[This invention relates to seats and deals particularly with a seat designed to be used primarily by infants. The seat is constructed so as to serve both as a seat when vertically supported or as a temporary bed when supported longitudinally.

Seats of this general character now available have a seat bottom, a solid seat back extending upwardly from the seat bottom, and sides secured to the seat bottom and marginal sides of the seat back. Due to the solid construction of the seat back, they are uncomfortable for infants and hence separate pads are utilized to impart some resiliency to the seat back area. These added pads are an additional expense to the production of the seats.

With these thoughts in mind, the instant invention contemplates an infant seat having a seat back which is resilient to the extent of providing a cushioned area over the major portion of the seat back. It is common practice in seats of this type to place the seats upon proper supports such as an adult chair or the like so that the seat back is disposed at an acute angle to the horizontal and it follows that the smaller the angle of the seat back to the horizontal the more weight of the infant is absorbed or diverted upon the seat back. As the seat back disclosed in the instant invention is resilient it will act as a cushion. This feature is especially effective when the seat is used to carry an infant from one place to another, the seat back cushions the infant from shock or bumps which normally are experienced when the seat is carried in the arms of an adult or upon the seat of an automobile.

A feature of the present invention resides in the provision of an infant seat, which may be formed in its entirety from a sheet of flexible resilient material such as polyethylene which is a durable substance as well as one which may be effectively colored.

A further feature of this invention resides in the provision of suitable apertures and slots through which cords and straps may be attached for securing the seat to a suitable support and for strapping an infant into the seat.

An added feature of the present invention lies in the provision of an infant seat having a perforated back which reduces the weight of the seat and adds to the cushioning action of the back.

These and other novel features and advantages will appear from the following description taken in connection with the drawings wherein.

Figure 1:
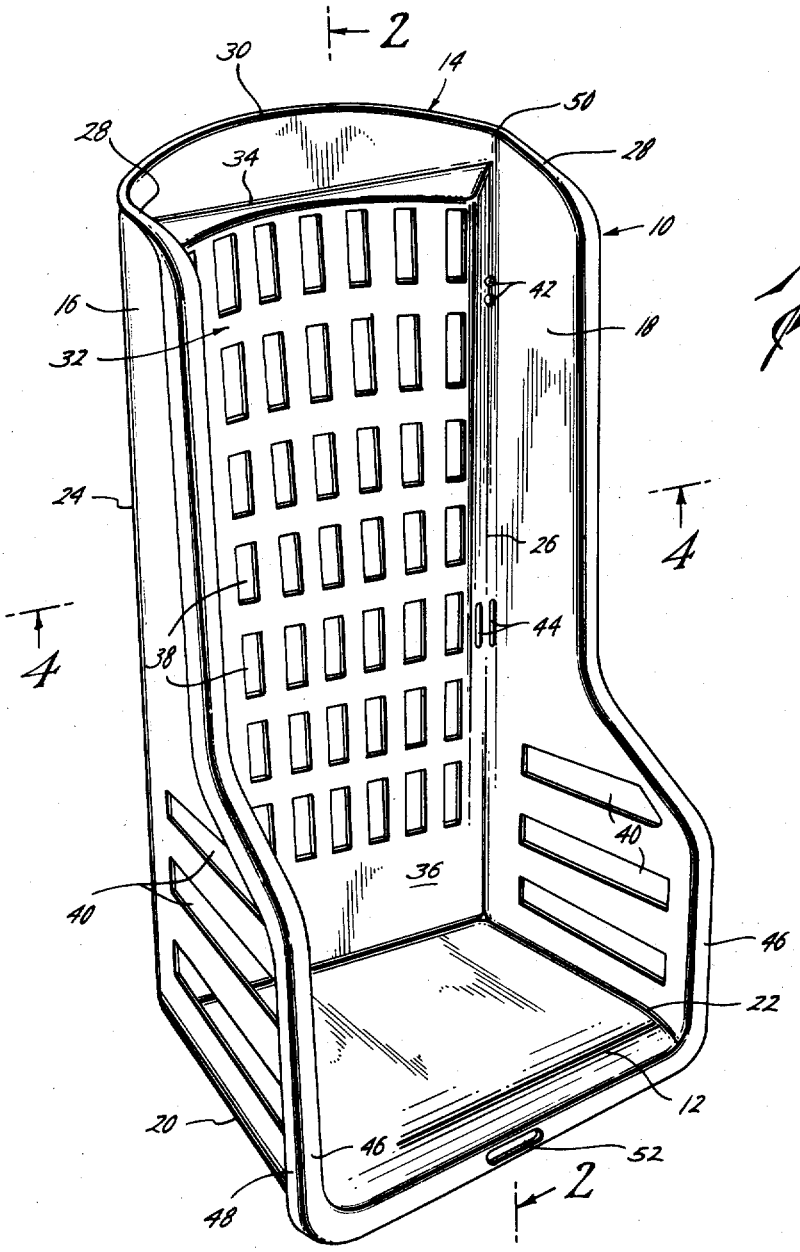
FIGURE 1 is a perspective view of the new infant seat.
Figure 2:
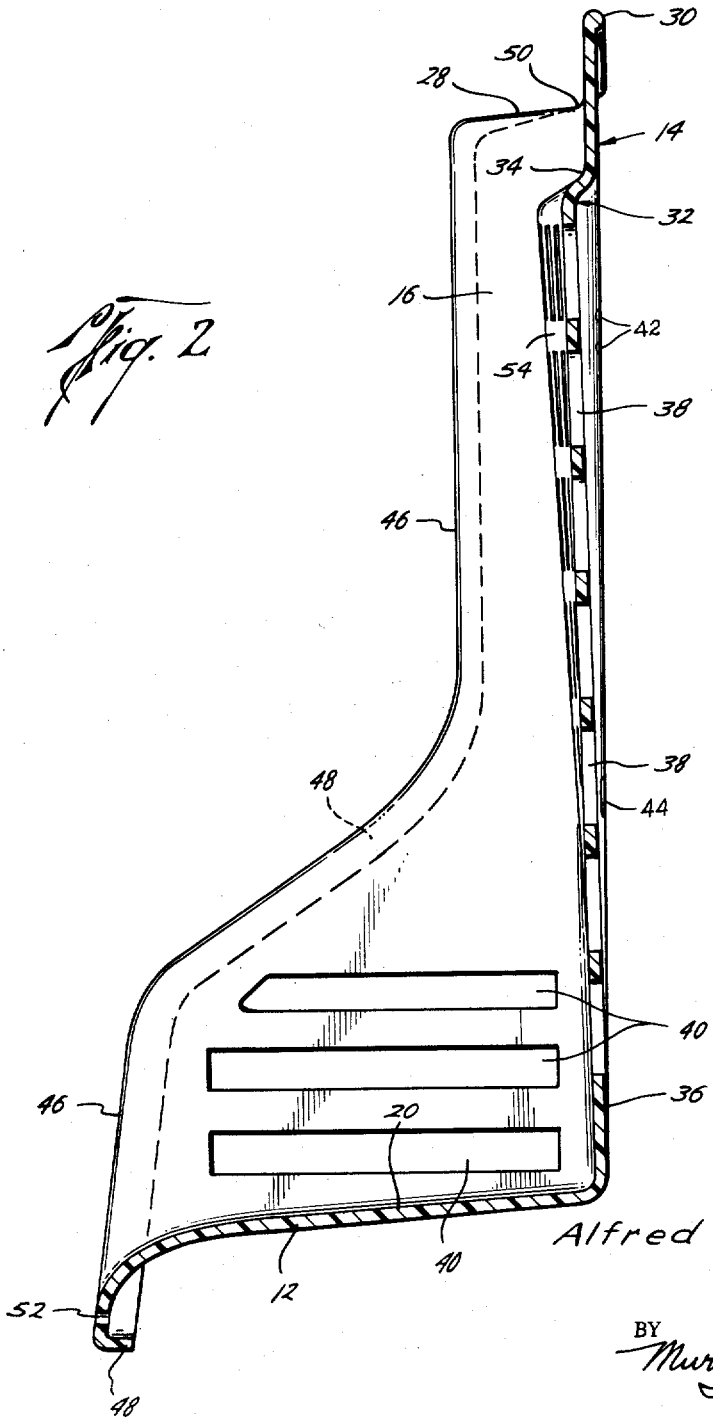
FIGURE 2 is an enlarged vertical sectional view taken substantially on line 2—2 through the seat as depicted in FIGURE 1.

The infant seat, generally indicated by the numeral 10 is formed of a sheet of flexible resilient material and is a one piece structure save for the detachable cords and straps which are now shown in the drawings.

The infant seat is provided with a seat bottom 12 and a seat back generally indicated by the numeral 14. Side panels 16 and 18 are secured to the seat bottom 12 along opposite edges 20 and 22 and to the seat back along opposite edges 20 and 22 and to the seat back along opposite edges 24 and 26. The upper edges 28 of the sides 16 and 18 may be slightly tapered to form a continuous line with the upper edge 30 of the seat back 14.

An offset central portion generally indicated by the numeral 32 extends from a transverse line 34 on the inner surface of the seat back near the upper edge thereof to a transverse line near the seat bottom 12 approximately located at 36. This offset portion projects forwardly of the vertical seat edges 24 and 26 and is provided with a series of spaced slots or apertures 38. The primary purpose of the slots is to add resiliency to the offset portion. However, they provide ventilation to the seat and are a method of conserving material which also tends to decrease the overall weight of the finished article.

The widened portions of the side panels 16 and 18 adjacent the seat bottom are similarly provided with elongated slots 40 for the purpose of conserving material and to provide ventilation.

The upper portion of the seat back is provided on each side along edges 24 and 26 with a pair of apertures 42. Cords or the like may be attached through these apertures so that the infant seat may be secured to a support such as the back of an adult chair or to the back of an automobile seat.

A pair of slots 44 are disposed through the seat back at a point below a transverse centerline through which straps may be secured for holding an infant in the seat.

The infant seat is further provided with a marginal flange 46 extending at substantially a right angle from the sides 16 and 18 and from the seat bottom 12. A further flange 48 is secured to the flange 46 and extends rearwardly at substantially a right angle. The flanges 46 and 48 combine with the sides 16 and 18 and seat bottom 12 to form channel-shaped marginal reinforcements, as well as an effective means for grasping the seat. The flanges both extend upwardly of the sides to terminate at point 50 adjacent the upper edge 30 of the seat back.

A slot 52 is disposed through the flange 46 adjacent the seat bottom. This slot is adapted to accommodate an infant restraining strap designed to extend between the legs of the infant and to connect with the transverse straps anchored in the slots 44, or to serve as a support for anchoring straps.

Figures 3, 4:
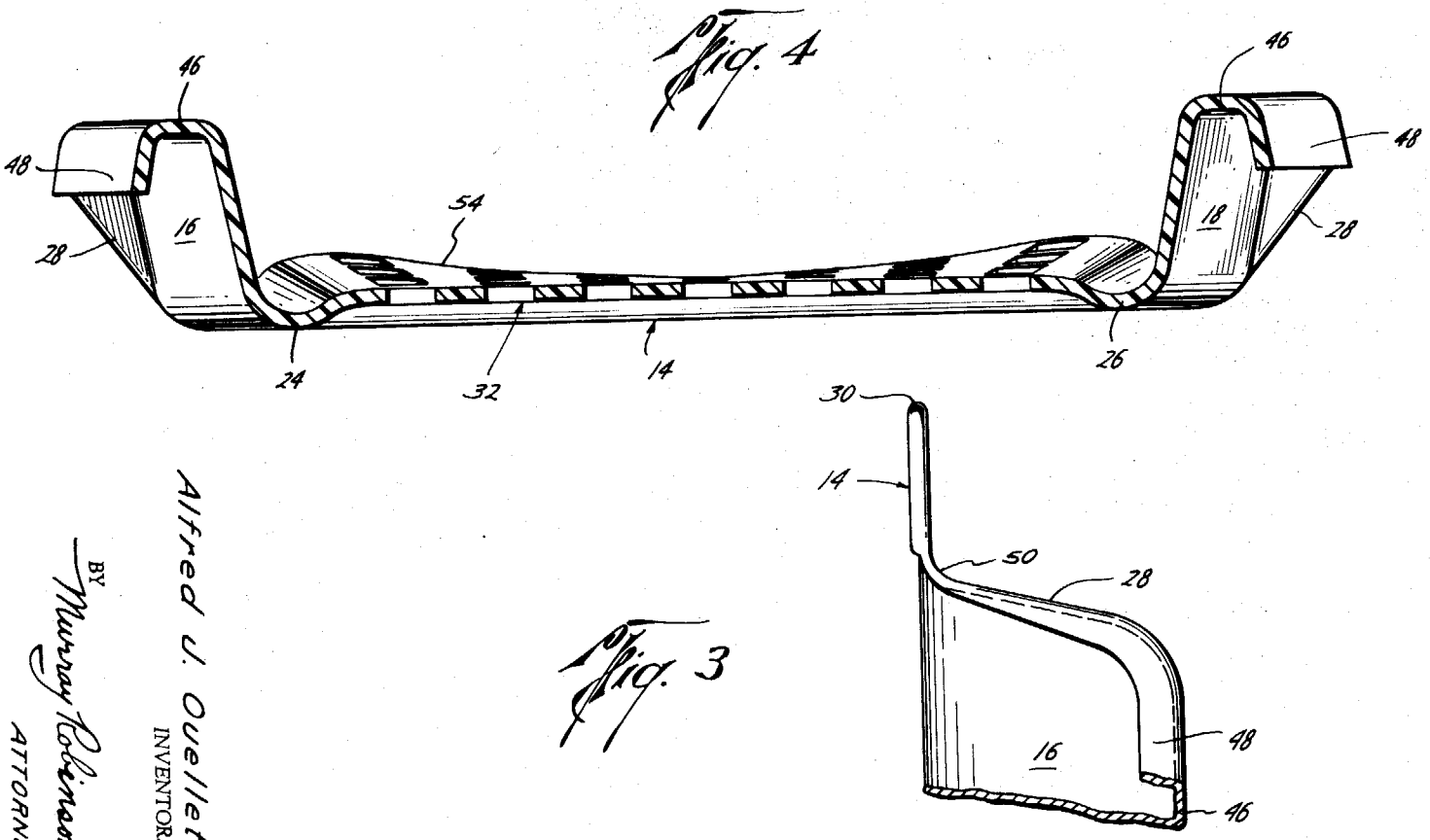
FIGURE 3 is a fragmentary view of a portion of the seat side and integrally formed marginal flange.
FIGURE 4 is a transverse sectional view taken through the seat back substantially on line 4—4 of FIGURE 1.

As best seen in FIGURE 4, the inner surface of the offset portion 32 may be provided with a concave curve as indicated at 54 extending transversely between the marginal edges 24 and 26. This curve is adapted to accommodate the contours of an infant's body, adding to the comfort of the infant seat.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded unnecessary.

Changes in shape, size, and arrangement of details and parts such as come within the purview of the invention claimed may be resorted to in actual practice, if desired.]

I claim:

1. A baby [seat] *carrier* comprising a [body] *shell* of flexible resilient sheet material including a [seat] bottom *having forward, rear, and side edges,* a [seat] back *having upper, lower, and side edges with the lower edge integral with the rear edge of said bottom and* extending upwardly from said bottom, and unitary sides secured to opposite *side* edges of said [seat] bottom and said [seat] back *along the length of the back from said bottom to the upper end of said back, said sides each having a forwardly facing front edge extending from said bottom to said upper end,* said [seat] back having an [offset] *apertured* central portion extending through the major portion of its width and terminating closely adjacent to the upper edge of said [seat] back, said central portion [being offset forwardly from the marginal portions of the seat back, said offset portion being substantially flat in vertical section] *having a plurality of transversely spaced apertures therein, said sides and bottom being provided at their forward edges with marginal flanges extending outwardly and rearwardly forming with the adjacent portions of the sides and bottom rearwardly opening channel-shaped stiffening and reinforcing means,* said central portion forming a resilient cushioning member when the [marginal portion of the seat back is against a support] *carrier is supported by said marginal flange.*

2. [The structure of claim 1] *A baby seat comprising a body of flexible resilient sheet material including a seat bottom, a seat back extending upwardly from said bottom, and unitary sides secured to opposite edges of said seat bottom and said seat back, said seat back having an offset central portion extending through the major portion of its width and terminating closely adjacent to the upper edge of said seat back, said central portion being offset forwardly from the marginal portions of the seat back, said offset portion being substantially flat in vertical section, said central portion forming a resilient cushioning*

*member when the marginal portion of the seat back is against a support,* and including a marginal generally channel-shaped reinforcing and stiffening edge along the forward edges of the sides and seat bottom.

3. [The structure of claim 1 and including a] *A baby carrier comprising a shell of flexible resilient sheet material including a bottom having forward, rear, and side edges, a back having upper, lower, and side edges with its lower edge integral with the rear edge of said bottom and extending upwardly from said bottom, and unitary sides secured to opposite side edges of said bottom and said back along the length of the back from said bottom to the upper end of said back, said sides each having a forwardly facing front edge extending from said bottom to said upper end, said back having an apertured central portion extending through the major portion of its width and terminating closely adjacent to the upper edge of said back, said central portion having a plurality of transversely spaced apertures therein, said apertures also being spaced vertically leaving webs therebetween extending transversely of said central portion, said sides and bottom being provided at their forward edges with* marginal *flanges extending outwardly and rearwardly forming with the adjacent portions of the sides and bottom rearwardly opening channel-shaped stiffening and* reinforcing [edge which is stiff and rigid relative to the remainder of the body] *means, said central apertured portion forming a resilient cushioning member when the carrier is supported by said marginal flanges.*

4. [The structure as set forth in claim 1] *A baby carrier comprising a one-piece shell of flexible resilient sheet material including a bottom having front, rear, and side edges, a back extending upwardly from the rear edge of said bottom with the lower edge and the mid-point of the upper edge thereof residing substantially in a plane forming an obtuse angle with said bottom, said back having a raised section extending from the rear edge of said bottom to closely adjacent the upper edge of the back, said raised section being disposed at a lesser angle to said bottom than is said plane so that said section is offset from said plane to a greater degree near the upper edge of said back, and sides integral with the side edges of said bottom and the side edges of said back extending generally vertically from said bottom along the length of the back from said bottom to the upper end of said back, each of said sides having a forwardly facing front edge extending from said bottom to said upper end of the back, each of said sides including a lower portion below a plane through the transverse centerline of the back which plane is parallel to the bottom of the carrier and an upper portion above said plane, said lower portion of each said sides including a lowermost portion coextensive in depth to that of the side edges of said bottom and including a transition portion thereabove whose front edge is inclined relative to the back of the carrier, said transition portion joining with the upper portion of the side, said upper portion having a lesser depth than said lowermost portion,* and [in which the forward edges of said sides and said seat bottom are provided with a substantially right angularly extending marginal flange,] a [further] flange [secured to said first mentioned flange and extending] *projecting outwardly and then* rearwardly [therefrom] *from the front edge of each of said sides forming together with said side a rearwardly opening channel extending from adjacent said front edge of the bottom of the baby carrier following the contour of the front edge of the side to near the upper end of the side, said channel increasing the rigidity of the marginal portion of the baby carrier at the sides thereof without destroying the flexibility of the back, and the portion of said rearwardly opening channel at said transition portion of each of the sides further providing convenient grasping means when the baby carrier is in an inclined position, the raised section of the back being provided with a plurality of apertures transversely and vertically spaced apart, providing ventilation and added cushioning action to said raised section of the back, and a flange projecting downwardly and then rearwardly from the front edge of the bottom of the carrier joining integrally with said flanges at the sides of the carrier in order further to increase the rigidity of the marginal portions of the baby carrier without destroying the flexibility of the back, said flange at the bottom of the carrier providing a convenient grasping means adapted to extend under the legs of a baby placed in the carrier.*

5 The structure as set forth in claim 1 and in which said central [offset] *apertured* portion is provided with a transverse curve of concave section between said marginal portions.

6. The structure as set forth in claim [1] 2 and in which said central offset portion is provided with a series of transversely and vertically spaced slots for the purpose of imparting additional resiliency to said offset portion.

7. A baby [seat] *carrier* comprising a one-piece [body] *shell* of flexible resilient sheet material including a [seat portion] *bottom* having front, rear and side edges, a back [portion] extending upwardly from the rear edge of said [seat portion] *bottom* with the lower [,] *edge and the midpoint of the* upper [and side edges] *edge* thereof residing *substantially* in a plane forming an obtuse angle with said seat [portion] *bottom,* said back [portion] having a raised section extending from the rear edge of said [seat portion] *bottom to closely adjacent the upper edge of the back, said raised section being disposed* at a lesser [obtuse] angle *to said bottom* than *is* said plane so that said section is offset *from said plane* to a greater degree near the upper edge of said back [portion], and [slightly diverging side portions] *sides* integral with the side edges of said [seat portion] *bottom* and the side edges of said back [portion, said seat portions having their lower edges] *extending generally vertically from said bottom along the length of the back from said bottom to the upper end of said back, each of said sides having a forwardly, facing front edge extending from said bottom to said upper end of the back, each of said sides including a lower portion below a plane through the transverse centerline of the back which plane is parallel to the bottom of the carrier and an upper portion above said plane, said lower portion of each of said sides including a lowermost portion* coextensive in depth to that of the side edges of said [seat portion] *bottom* and *including a transition portion thereabove whose front edge is inclined relative to the back of the carrier, said transition portion joining with the upper portion of the side, said upper portion* having a lesser depth [nearer the upper edge of said back portion] *than said lowermost portion, and a flange projecting outwardly and then rearwardly from the front edge of each of said sides forming together with said side a rearwardly opening channel extending from adjacent said front edge of the bottom of the baby carrier following the contour of the front edge of the side to near the upper end of the side, said channel increasing the rigidity of the marginal portion of the baby carrier at the sides thereof without destroying the flexibility of the back, and the portion of said rearwardly opening channel at said transition portion of each of the sides further providing convenient grasping means when the baby carrier is in an inclined position.*

8. The structure as set forth in claim 7 in which said raised section is provided with rectangular slots oriented in a parallel relationship to the side edges of said back [portion].

9. [The structure as set forth in claim 8 including] *A baby seat comprising a one-piece body of flexible resilient sheet material including a seat portion having front, rear and side edges, a back portion extending upwardly from the rear edge of said seat portion with the lower, upper and side edges thereof residing in a plane forming an obtuse angle with said seat portion, said back portion having a raised section extending from the rear edge of said seat*

*portion at a lesser obtuse angle than said plane so that said section is offset to a greater degree near the upper edge of said back portion, and slightly diverting side portions integral with the side edges of said seat portion and the side edges of said back portion, said side portions having their lower edges coextensive in depth to that of the side edges of said seat portion and having a lesser depth nearer the upper edge of said back portion, said raised section being provided with rectangular slots oriented in a parallel relationship to the side edges of said back portion, and* an integral reinforcing flange extending along the front edge and following the contour of said side portions to a [lcous] *locus* near the upper ends of said side portions.

10. A baby seat comprising a one-piece body of flexible resilient sheet material including a seat portion having front, rear and side edges, a back portion extending upwardly from the rear edge of said seat portion with the lower, upper and side edges thereof residing in a plane forming a predetermined angle with said seat portion, said back portion having a raised section extending from the rear edge of the seat portion at a lesser angle than said plane so that said section is offset to a greater degree near the upper edge of said back portion, [and] side [portion] *portions* integral with the side edges of said seat portion and the side edges of said back portion, *and an integral reinforcing flange extending along the front edge of said seat portion and following the contour of said side portions to a locus near the upper ends of said side portions leaving said upper ends unconnected one to the other except by said back.*

*11. A baby carrier comprising a shell of flexible resilient sheet material including a bottom, a back extending upwardly from said bottom, and unitary sides secured to opposite edges of said bottom and back along the length of the back from said bottom to the upper end of said back, said sides each having a forwardly facing front edge extending from said bottom to said upper end, said sides having their lower edges coextensive in depth to the side edges of the bottom and having a lesser depth nearer the upper end of said back with a transition portion therebetween, the deeper portions of said sides being apertured, said apertured deeper portions of the sides being adapted to ventilate the hips of a baby disposed in said baby carrier, said sides and bottom being provided at their forward edges with integral marginal flanges forming with the adjacent portions of the sides and bottom channels opening toward the rear of the carrier, said back having an apertured central portion extending through the major portion of its width provided with a plurality of transversely and vertically spaced and aligned apertures with a vertical web between each adjacent pair of vertically aligned groups of apertures and a transverse web between each adjacent pair of transversely aligned groups of apertures, said transverse webs being curved in horizontal section, being concave as viewed from the front, said central portion extending upwardly from near the bottom of the carrier and terminating near the upper edge of the back, said central portion being offset forwardly from the marginal portions at the upper and lower edges of the back, said central portion being forwardly offset more near the upper edge of the back than near the lower edge, said curvature of said transverse webs of the back causing the sides of the back to be forwardly offset more than the mid-portion thereof, said central portion forming a resilient cushioning member when the carrier is supported from said channels and also when said marginal portion at the upper and lower end of the back are against a support, the portion of said rearwardly opening channel of said transition portion of each side providing convenient grasping means when the carrier is in a partially inclined position, said rearwardly opening channel formed at the front edge of the bottom providing a grasping means adapted to extend under the legs of a baby placed in the carrier.*

*12. The structure as set forth in claim 11 including gutters between the sides of the baby carrier and the apertured central portion of the back, said gutters being displaced rearwardly of said central portion and extending from near the upper edge of the back of the carrier down toward the bottom and gradually decreasing in depth as they approach the bottom of the baby carrier.*

*13. A baby carrier comprising a one-piece shell of flexible resilient sheet material including a bottom having front, rear, and side edges, a back having upper, lower, and side edges extending upwardly from the rear edge of said bottom, and unitary sides secured to opposite edges of said bottom and said back along the length of the back from said bottom to the upper end of said back, said sides having upper, lower and intermediate portions, the lower portions being coextensive in depth to the side edges of the bottom, the upper portions being of a lesser depth and the intermediate portions being of transitional depth, said sides each having a forwardly faring front edge extending from said bottom to the upper end of said back, said sides being provided at their forward edges with integral marginal flanges which project outwardly, then rearwardly, from the front edges of said sides forming together with said sides rearwardly opening channels extending from adjacent said front edge of the bottom of the baby carrier and following the contour of the front edges of the sides to a locus adjacent the upper ends of the sides, said flanges providing strengthening means for the sides together with strengthening and gripping means for the carrier along the intermediate portions of transitional depth when the baby carrier is in a partially inclined position.*

*14. A baby carrier according to claim 13 including a flange integral with the front edge of the bottom of the carrier and extending downwardly and then rearwardly so as to form together with said bottom a rearwardly opening channel which is adapted to provide carrier gripping means under the legs of a baby placed in the carrier.*

*15. A baby carrier comprising a one-piece shell of flexible resilient sheet material including a bottom having front, rear, and side edges, a back having upper, lower and side edges extending upwardly from the rear edge of said bottom, and unitary sides secured to opposite edges of said bottom and said back along the length of the back from said bottom to the upper end of said back, said sides each having a forwardly facing front edge extending from adjacent the front edge of said bottom to said upper end of the back, a flange projecting outwardly and then rearwardly from the front edge of each of said sides forming together with said sides a rearwardly opening channel, each of said flanges extending from adjacent said front edge of the bottom of the baby carrier following the contour of the front edge of the side, and terminating near the upper end of said side.*

*16. A baby carrier as set forth in claim 15 including an apertured central portion extending through a major portion of the length and width of the back.*

*17. A baby carrier according to claim 16 wherein the bottom portions of the sides are provided with a plurality of apertures, and including an additional flange integral with the front edge of the bottom of the baby carrier and continuous with said flanges along the sides.*

*18. A baby carrier as set forth in claim 16 wherein the apertures that form said apertured central portion are positioned to form between them groups of parallel webs, the apertures being located between the webs, said groups of webs being so disposed that the webs in one group are transverse to those in another group, the webs in said one group extending vertically and those in said other group extending horizontally.*

*19. A baby carrier according to claim 15 wherein the bottom portions of the sides are provided with a plurality of apertures.*

*20. A baby carrier according to claim 19 wherein the apertures in the bottom portions of the sides are so dis-*

*posed as to form substantially horizontally extending webs therebetween.*

*21. A baby carrier according to claim 20 including an additional flange integral with the front edge of the bottom of the baby carrier and continuous with the said flanges along the sides, said additional flange extending downwardly then rearwardly so as to form together with said bottom a rearwardly opening channel, said additional flange adding to the rigidity of the sides of the baby carrier without destroying the flexibility of the back.*

*22. A baby carrier according to claim 19 wherein the sides of the baby carrier slightly diverge disposing said front edges of the sides farther apart than said side edges of the back.*

References Cited by the Examiner

The following references, cited by the Examiner, are of record in the patented file of this patent or the original patent.

UNITED STATES PATENTS

| | | | |
|---|---|---|---|
| D. 183,233 | 7/58 | Ahrens | 15—8 |
| 1,576,613 | 3/26 | Kellogg | 297—460 |
| 2,324,421 | 7/43 | Ouellette | 297—310 |
| 2,808,875 | 10/57 | Bargen | 297—457 |
| 2,818,107 | 12/57 | Thaden | 297—418 |
| 2,828,489 | 4/58 | Baker | 4—173 |

FRANK B. SHERRY, *Primary Examiner.*